(12) United States Patent
Mohaban (10) Patent No.: US 7,782,897 B1
(45) Date of Patent: *Aug. 24, 2010

(54) MULTIMEDIA OVER INTERNET PROTOCOL BORDER CONTROLLER FOR NETWORK-BASED VIRTUAL PRIVATE NETWORKS

(75) Inventor: Shai Mohaban, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 175 days.

This patent is subject to a terminal disclaimer.

(21) Appl. No.: 12/132,884

(22) Filed: Jun. 4, 2008

Related U.S. Application Data (63) Continuation of application No. 10/929,064, filed on Aug. 26, 2004, now Pat. No. 7,411,975.

(51) Int. Cl.
*H04J 3/16* (2006.01)
(52) U.S. Cl. .................................................. 370/466
(58) Field of Classification Search ................ 370/466, 370/467, 469, 473, 474, 392, 396, 389, 401, 370/400, 471, 395.53, 395.52, 351, 393; 709/242, 239
See application file for complete search history.

(56) References Cited

U.S. PATENT DOCUMENTS

| | | | |
|---|---|---|---|
| 5,235,595 | A | 8/1993 | O'Dowd |
| 5,999,525 | A | 12/1999 | Krishnaswamy et al. |
| 6,151,318 | A | 11/2000 | Woodward et al. |
| 6,226,285 | B1 | 5/2001 | Kozdon et al. |
| 6,263,371 | B1 | 7/2001 | Geagan, III et al. |
| 6,266,341 | B1 | 7/2001 | Surprenant et al. |
| 6,278,707 | B1 | 8/2001 | MacMillan et al. |
| 6,282,192 | B1 | 8/2001 | Murphy et al. |
| 6,292,480 | B1 | 9/2001 | May |
| 6,292,482 | B2 | 9/2001 | Pickett |
| 6,292,840 | B1 | 9/2001 | Blomfield-Brown et al. |
| 6,339,595 | B1 | 1/2002 | Rekhter et al. |
| 6,370,571 | B1 | 4/2002 | Medin, Jr. |
| 6,389,038 | B1 | 5/2002 | Goldberg et al. |
| 6,411,601 | B1 | 6/2002 | Shaffer et al. |
| 6,442,169 | B1 | 8/2002 | Lewis |
| 6,477,164 | B1 | 11/2002 | Vargo et al. |

(Continued)

OTHER PUBLICATIONS

U.S. Appl. No. 11/510,946, filed Aug. 28, 2006 to Shai Mohaban et al.

(Continued)

*Primary Examiner*—Chi H Pham
*Assistant Examiner*—Alexander Boakye
(74) *Attorney, Agent, or Firm*—Shumaker & Sieffert, P.A (57) ABSTRACT

A method for communicating packet multimedia data between a source endpoint and a destination endpoint is disclosed, wherein at least the source endpoint is within a virtual private network, and comprises the steps of receiving, at a signaling controller, a first signaling packet from the source endpoint, wherein the source endpoint is within a virtual private network; determining whether the source endpoint and destination endpoint may communicate directly over the same virtual private network; when the source endpoint and destination endpoint cannot communicate directly over the same virtual private network, associating a unique identifier of the source endpoint with a virtual private network identification marker; when the source endpoint and destination endpoint can communicate directly over the same virtual private network, instructing the source endpoint and destination endpoint to communicate media packets directly.

10 Claims, 6 Drawing Sheets

U.S. PATENT DOCUMENTS

| | | |
|---|---|---|
| 6,608,841 B1 | 8/2003 | Koodli |
| 6,614,781 B1 | 9/2003 | Elliott et al. |
| 6,618,397 B1 | 9/2003 | Huang |
| 6,654,373 B1 | 11/2003 | Maher, III et al. |
| 6,700,888 B1 | 3/2004 | Jonsson et al. |
| 6,738,351 B1 | 5/2004 | Qureshi et al. |
| 6,751,746 B1 | 6/2004 | Jain et al. |
| 6,760,324 B1 | 7/2004 | Scott et al. |
| 6,775,267 B1 | 8/2004 | Kung et al. |
| 6,788,675 B1 | 9/2004 | Yang |
| 6,791,944 B1 | 9/2004 | Demetrescu et al. |
| 6,970,450 B1 | 11/2005 | Scott |
| 7,209,473 B1 | 4/2007 | Mohaban et al. |
| 7,411,975 B1 * | 8/2008 | Mohaban .................. 370/466 |
| 2002/0046405 A1 | 4/2002 | Lahr |
| 2003/0091028 A1 | 5/2003 | Chang et al. |
| 2003/0152068 A1 | 8/2003 | Balasaygun et al. |
| 2003/0188001 A1 | 10/2003 | Eisenberg et al. |

OTHER PUBLICATIONS

Office Action from U.S. Appl. No. 11/510,946, dated Dec. 11, 2009, 14 pp.

Response to Office Action dated Dec. 11, 2009, from U.S. Appl. No. 11/510,946, filed Mar. 11, 2010, 4 pp.

* cited by examiner

MULTIMEDIA OVER INTERNET PROTOCOL BORDER CONTROLLER FOR NETWORK-BASED VIRTUAL PRIVATE NETWORKS

This application is a Continuation of U.S. application Ser. No. 10/929,064, filed Aug. 26, 2004, the entire contents of which is incorporated herein by reference.

FIELD OF THE INVENTION

The present invention relates generally to transmission of multimedia over Internet protocol (MoIP) networks, and more specifically relates to MoIP transmission in networks that include one or more virtual private networks (VPNs).

BACKGROUND OF THE INVENTION

The present invention relates to Network communication carriers currently provide network-based virtual private network (VPN) capabilities over their networks. Generally providing VPN capabilities requires the use of technologies such as virtual routing at edge access routers and aggregation routers, multi-protocol label switching (MPLS), asynchronous transfer mode (ATM) permanent virtual circuits (PVCs), and the like, in devices that make up the backbone of the network. The virtual routing technology allows the carrier to present, to each of its enterprise customers, a set of virtual routers that are considered as owned and managed by the customer for the purpose of connection of among different customer sites. The use of MPLS, or any other comparable technology, allows these virtual routers to efficiently create and maintain virtual links between the different virtual routers over the carrier's shared network backbone.

For many such carriers, adding multimedia services, and particularly voice services, on top of their existing IP networks, is the natural next step. Most carriers prefer to build a single shared resource to provide the multimedia services to the entire customer base, rather than building dedicated resources for each individual enterprise customer. The shared resource is often built as yet another VPN on top of the existing infrastructure, and is sometimes called a "Centralized Voice Extranet". The centralized voice extranet is implemented at a carrier centralized office (CO) where call control, call termination and other call servers, such as interactive voice response (IVR), conference, and voice mail servers, are co-located for the purpose of providing the service to enterprise customers.

In general, multimedia (and other) entities of different customers residing at different VPNs are not routable from one another, because deployment of VPNs keeps each VPN private so that its constituent devices are not exposed to other networks. Moreover, more often than not the VPNs use private IP address schemes that overlap with each other (e.g. addresses of the range 10.0.0.x or 192.168.x.x).

One way to provide centralized voice services for such enterprise customers is to employ devices that provide network address translator and firewall (NAT/FW) functions at the edge of the customer networks. This approach ensures that each enterprise is protected from the rest of the network and is uniquely addressable. However, this approach also requires expensive, and otherwise redundant, equipment to be added to each enterprise network and further complicates the routing scheme and limits the use of the virtual routers at the network itself. For the purpose of providing voice services the NAT/FW function also must support multimedia over Internet protocol (MoIP) or voice over Internet protocol (VoIP), which is known to be a significant challenge.

Therefore, in view of the limitations of the prior art, it would be advantageous to provide MoIP or VoIP services for customers that are not located on the same VPN, while not compromising the security of the VPNs.

SUMMARY OF THE INVENTION

According to one aspect of the invention, a multimedia over Internet Protocol border controller for network-based virtual private networks is provided.

In one embodiment, an apparatus for processing data packets representing multimedia over Internet Protocol (MoIP) calls in a carrier network is provided. All endpoints on the carrier network, including those that are a part of a virtual private network (VPN), register through the apparatus, which is coupled with the centralized office of the carrier. During registration, an endpoint is configured to send a registration message to the apparatus. As the registration message makes its way towards the apparatus, an edge router or aggregation router in the path of the message attaches a VPN ID that uniquely identifies the particular VPN from which the message was sent. The apparatus associates the source endpoint's IP address, port, and VPN ID with the apparatus' own IP address and a port number, to which the destination endpoint will respond. The apparatus converts the source endpoint's address in subsequent response messages to the correct IP address and port number. Based on stored VPN ID, the apparatus can determine to which VPN such messages will be routed.

In one embodiment, the apparatus includes the functions of performing address translation and payload fix-up for each message, so that resulting messages adhere to network requirements and the signaling protocol that is in use. The apparatus may also detect whether hair-pinning can be avoided and modify message addressing to avoid hair-pinning.

In another aspect, methods for implementing the foregoing features are provided. According to one such aspect, a method for communicating packet multimedia data between a source endpoint and a destination endpoint, wherein at least the source endpoint is within a virtual private network, comprises the steps of receiving, at a signaling controller, a first signaling packet from the source endpoint, wherein the source endpoint is within a virtual private network; determining whether the source endpoint and destination endpoint may communicate directly over the same virtual private network; when the source endpoint and destination endpoint cannot communicate directly over the same virtual private network, associating a unique identifier of the source endpoint with a virtual private network identification marker; when the source endpoint and destination endpoint can communicate directly over the same virtual private network, instructing the source endpoint and destination endpoint to communicate media packets directly.

In another aspect, the invention provides a border controller for the purpose of handling multimedia over Internet protocol where endpoints are part of one or more virtual private networks is shown. The apparatus and method teach how to enable the communication between endpoints potentially belonging to different, and often unroutable, networks while maintaining the level of security required by the private networks. Other aspects and features will become apparent from the following description and appended claims.

DETAILED DESCRIPTION OF THE PREFERRED EMBODIMENT

A multimedia over Internet Protocol border controller for network-based virtual private networks is disclosed. Various embodiments provide an apparatus and methods for bridging different virtual private networks (VPNs), in a secure manner at the application level. According to one embodiment, only the specific application endpoints are allowed to communicate with one another. For example, multimedia over Internet protocol (MoIP) or voice over Internet protocol (VoIP) endpoints connected to different VPNs can communicate with a centralized call control entity, and connections may be established between such endpoints. Furthermore, certain embodiments allow for communication of media servers and gateways in the carrier's centralized office. The different entities need not be aware of the topology of the network and the fact that multiple VPNs, and potentially overlapping addresses, are being used.

1. General Overview

In one embodiment, multimedia over Internet Protocol border controller may be placed in a conventional carrier network in a manner that does not affect operation of other network devices. Using such a transparent platform, a variety of problems relating to network operation can be effectively resolved without requiring modifications to the existing network infrastructure.

A multimedia over Internet Protocol border controller may be implemented, in one embodiment, using a signaling controller and media controller and associated applications. All types of data traffic may be processed. For example, the approaches herein apply, without limitation, to network traffic such as video over IP and to streaming media. It will be evident that various modifications and changes may be made thereto without departing from the broader spirit and scope of the invention. The specification and drawings are, accordingly, to be regarded in an illustrative rather than a restrictive sense.

Figure 1:
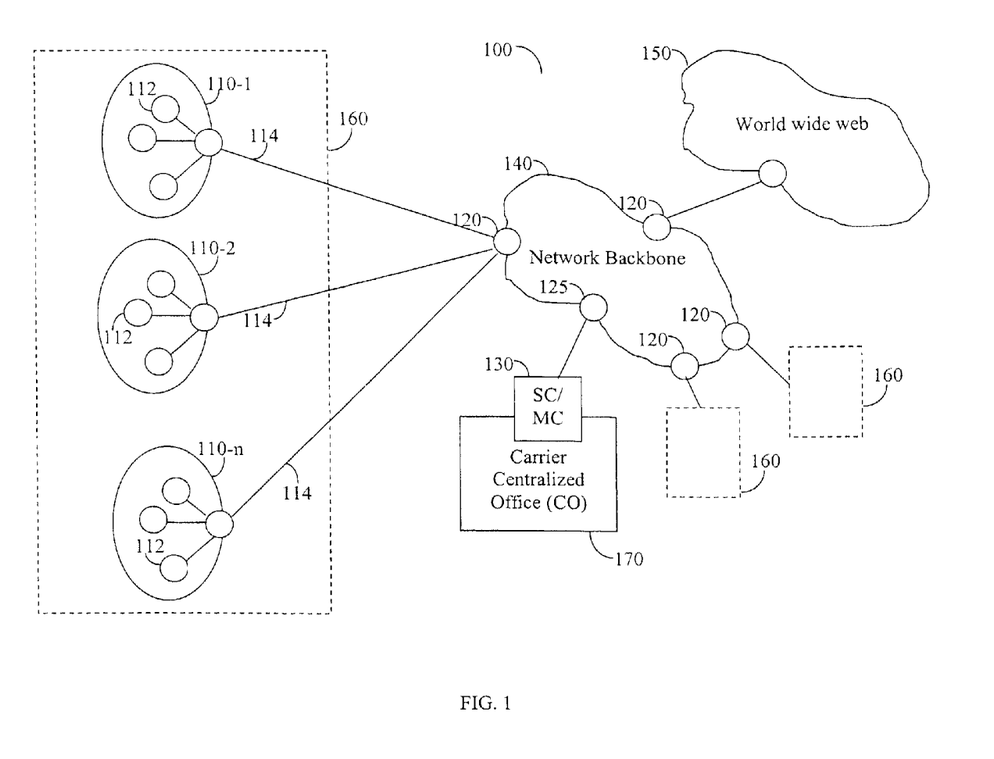
FIG. 1 is a schematic block diagram of a MoIP network.

FIG. 1 is a block diagram of a MoIP network 100. A carrier centralized office (CO) 170, comprises one or more networked call control servers (CCS), public switched telephone network (PSTN) gateways, voice mail servers, media servers, and other elements required to provide the services by the carrier. CO 170 is configured to operate in conjunction with apparatus 130 which implements the methods disclosed in more detail below. CO 170 may comprise units that are commercially available from Alcatel (series 1000 switching systems), BroadSoft (the BroadWorks™ servers), Siemens (series HiQ), Sylantro, and others.

In MoIP network 100 there are multiple VPNs 110 each having a plurality of multimedia endpoints 112. Each of the VPNs 110 is connected to an aggregation router 120 utilizing communications means such as T1, T3, Ethernet, or other communication links. A plurality of VPNs 110 may be aggregated as a sub-system 160 that is connected to a network backbone 140 of the carrier. The network backbone 140 comprises a plurality of routers and switches (not shown for clarity), and may be further connected to the Internet or a World Wide Web (WWW) network 150.

Addresses in each VPN 110, for example VPN 110-1, may overlap with addresses of another VPN, for example VPN 110-2. Such address overlap presents a problem when a device of one VPN seeks communicate MoIP packets to another VPN. Aggregation routers 120 at the edges of network backbone 140 provide the connectivity between the endpoints and CO 170.

With an apparatus 130, configured as disclosed herein, the limitations of the prior art are overcome. While apparatus 130 is shown herein to be a single device, the apparatus may comprise a separate signaling controller (SC) and media controller (MC), each configured to operate with CO 170 and further connected to network backbone 140. In one embodiment, SC and MC of apparatus 130 comprise units that are commercially available from assignee and known as the VoiceFlow™ series, specifically VoiceFlow 1000 and Voice-Flow 3000. In another embodiment, apparatus 130 comprises an apparatus having the structure and functions disclosed in prior U.S. provisional patent application Ser. No. 60/524,168, filed Dec. 20, 2003, entitled "Endpoint Compliance for Network Hosted NAT Traversal (NTRV)," or in prior U.S. application Ser. No. 09/724,943, filed Nov. 28, 2000, entitled "Method And Apparatus For Monitoring And Processing Voice Over Internet Protocol Packets," assigned to the assignee hereof, which is hereby incorporated by reference for purposes as if fully set forth herein. In the approach herein, such an apparatus is applied for use in conjunction with VPNs.

Oftentimes data protocols need to be supported between the endpoints and hosts in the virtual private networks and the shared CO 170. Examples include the IP endpoints requesting their configuration or software image using protocols such as FTP and TFTP, and users configuring their preferences (self-service) via protocols such as HTTP on Web servers located in the carrier's network. For this reason the apparatus 130 also supports data NAT-ting between the private VPNs and the shared CO 170.

2. VPN IDs

Regular NATs monitor the source IP address and port pair of packets coming from the "inside" network and translate it to the NAT device's own IP and an arbitrary port number. In the NAT function of apparatus 130, one additional parameter, which can identify the specific VPN the packet is coming from, is monitored as well, thereby providing for a VPN identifier (VPN ID). There are multiple ways to differentiate between the VPNs based on such VPN IDs.

In one embodiment, an edge router 120 attaches a virtual local area network (VLAN) tag to a packet coming from the corresponding VPN when sending packets from the different VPNs to apparatus 130. In another approach, different multiprotocol label switching (MPLS) labels are applied at the edge router 120 for the different VPNs. Yet another approach involves creating separate tunnels, for example, by using IPsec or GRE, between an edge router 120 and apparatus 130 for each VPN.

The best approach to use depends on the layer 2 infrastructure of the carrier. In most networks, the use of VLAN tags is the easiest way, because a router is logically positioned at the entrance of CO 170, and that router can already distinguish between VLANs because it is part of the same routing infrastructure. In the case of VLAN tags, whether the VLAN tags are applied by an edge router 120, a switch along the path, or an aggregation router 125 does not matter, as long as some device is assigning a VLAN tag to each message coming from an endpoint 112 behind a VPN 110.

In all such cases, apparatus 130 operates as a NAT device, translating the incoming source IP address and port number to its own IP address, or to an IP address assigned from a pool of such addresses if needed, and some port number. However, in addition the apparatus maintains in its NAT table a VPN ID for each stream, identifying the specific VPN source of that stream. The VPN ID is used for all subsequent communications back towards the source of the stream. An edge router 120 receiving such communications then knows to route the received packets to the real original source, by using the provided VPN ID. A standard IP network stream is defined by a 5-tuple, which comprises a source address, source port, destination address, destination port, and a protocol designator. In the approach herein, a 6-tuple defines a stream, as an additional component, namely the VPN ID, is added for identification purposes.

The approach herein is applicable to any IP communications protocol used between elements at one of the VPNs 110 and some element at CO 170. For multimedia over IP communications, translating only the IP header is insufficient to enable endpoints to communicate. Therefore, an Application Layer Gateway (ALG), an outbound proxy, or a Back-2-Back agent is required to translate the payload of the signaling messages.

Further, in all the approaches above, each endpoint 112 needs to be addressed at a specific IP address and port. Accordingly, apparatus 130 associates the IP address, port and VPN ID of each endpoint 112 with an IP address and port of apparatus 130. In one variation, apparatus 130 may also associate values of other parameters, such as the endpoint name, etc. Thus, for each endpoint 112, apparatus 130 translates a value triplet (<endpoint IP address, endpoint port, endpoint VPN ID>) to a value pair (<IP address, port>), which is used by CO 170 to communicate to that endpoint.

Although the preceding description relates to performing a 6-tuple-to-5-tuple mapping process for media packets, the techniques described herein also may be used to process data packets that do not represent voice-over-IP or other media information. For example, in one embodiment, the techniques herein may be used for data packets conforming to protocols that relate to or are used with VoIP protocols. As examples, the FTP and TFTP protocols are often used by endpoints to retrieve software images and configuration files from servers in the carrier network. Further, HTTP is often used by end users for self-provisioning various VoIP services and features using Web servers at the carrier network. For some protocols, such as FTP and TFTP, application layer gateways (ALGs) may be used also if performing IP header NAT-ting is insufficient.

3. Registration Process

Figure 2:
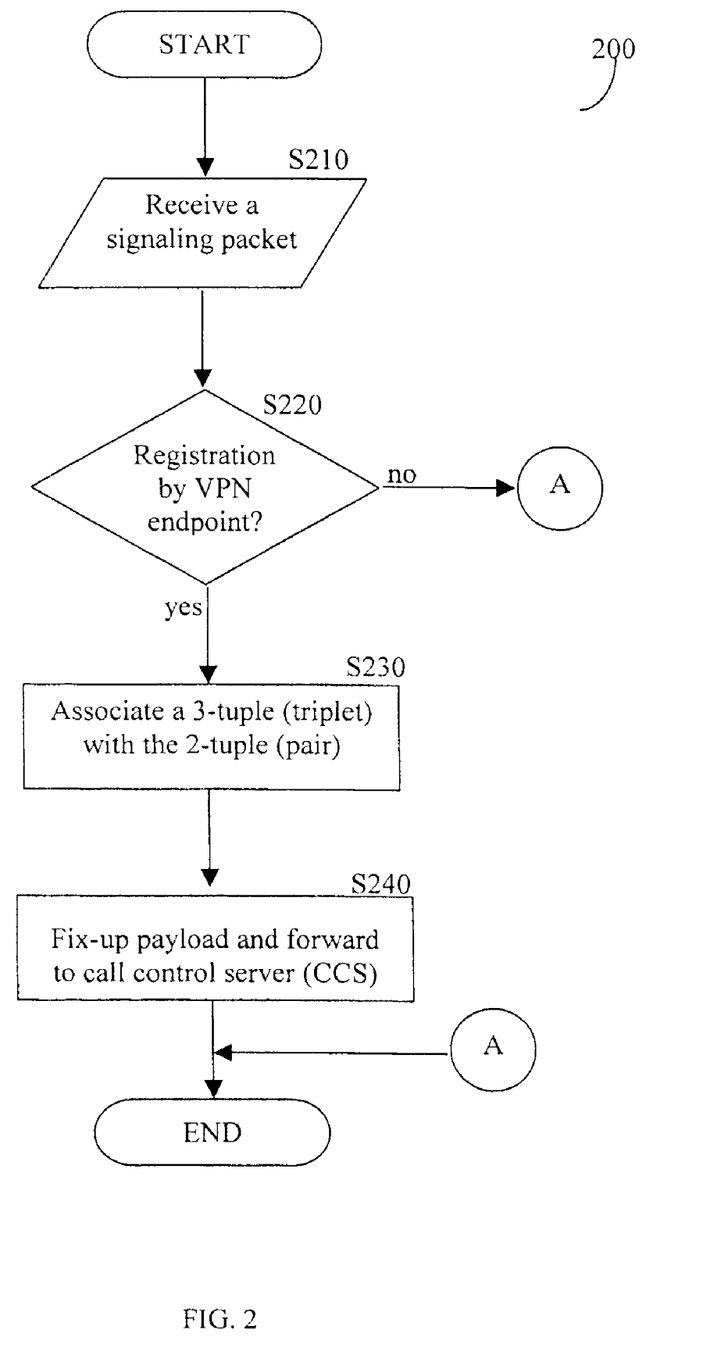
FIG. 2 is an exemplary flowchart for handling a registration packet from an endpoint in a VPN.

FIG. 2 is a flow diagram of a method for processing a first signaling packet from an endpoint in a VPN. In one implementation, process 200 may be used for handling a first signaling packet from an endpoint 112 in a VPN 110. In this context, the first signaling packet causes registration of an endpoint 112 in a VPN 110 for future communications.

In step S210, the SC element of apparatus 130 receives a signaling packet.

In step S220, apparatus 130 determines whether the packet is the first packet received from a source endpoint 112 that is further a part of a VPN 110. If the packet is not a registration packet, for example when the received packet is not the first packet from this particular endpoint 112, or when endpoint 112 has already been statically provisioned with an <IP address, port, VPN ID> triplet, then no further registration action is required; otherwise, execution continues with step S230.

In step S230 the value triplet <IP address, port, VPN ID> is extracted from the packet, arriving from an endpoint 112 inside a VPN 110, and is translated into an <IP address, port> pair appropriate for handling over the standard network. Such translation allows the destination endpoint, or a call control server of CO 170, to respond back to the endpoint 112 of the VPN 110. In such a response, the destination endpoint or call control server first uses the provided IP address and port, which is later translated back to the original triplet by apparatus 130 for proper operation in conjunction with VPN 110. Apparatus 130 is also able to perform VPN-to-VPN translation, when communication is required between two endpoints 112 both being part of different VPNs 110.

In step S240, a fix-up of the payload of the received packet is performed so that it adheres with the network requirements and the signaling protocol, such as SIP or H.323. The packet is then forwarded to a call control server of CO 170.

As an example of a payload fix-up in the case of the session initiation protocol (SIP), the 'Contact' field is now considered. According to the SIP protocol, all SIP requests generated by SIP endpoints must include a Contact field. As described in section 8.1.1.8 of RFC 3261, the Contact field contains the SIP URI by which the endpoint can be later contacted. When a source endpoint is behind a FW/NAT device (or in a private VPN), this URI can have the format "sip:xxx@10.0.0.123:5060." Apparatus 130 would replace such a URI with its own address and optionally also a new port number, such as "sip:xxx@134.90.82.234:24001." The modified URI allows endpoints from other VPNs to communicate with that source endpoint, since their messages are sent to apparatus 130, which then forwards the messages (after the reverse fix-up) towards the original endpoint.

Steps S230 and S240 may involve many different specific approaches to perform translation and payload fix-up. Two leading ways involve using a proxy and using a back-to-back user agent. In the proxy model, apparatus 130 receives a message, changes the address and port number and replaces them with its own address, and then forwards the altered message to CO 170. In this approach, apparatus 130 does not become a part of the call in any way. According to the Back-2-Back user agent (B2BUA) model, the call is terminated from one side, apparatus 130 becomes part of the call, and then apparatus 130 initiates the call on the other side.

The registration process is performed for each endpoint to ensure that it is registered with apparatus 130 and the appropriate address translation is applied. Therefore, in one embodiment, each endpoint 112 (for MoIP or VoIP) is identified when it sends a first packet, usually a registration request, towards CO 170. At this point the SC element of apparatus 130 associates the endpoint 112 with its source IP, port and VPN ID as well as an IP address and port with which endpoints external to the VPN can communicate. The SC element of apparatus 130 translates both the IP header and payload to reflect the original address and port. Therefore, when sending the packet back towards router 120 it will be able to direct it to the appropriate VPN, using the attached VPN ID, effectively using the 6-tuple rules. In some cases, for example in the case of VoIP gateways, the endpoints 112 do not dynamically register with the call control server of CO 170 but rather are statically provisioned. In such cases the endpoints 112 have to be provisioned not only with their IP address, and optionally their port number, but also with their respective VPN ID.

The network configuration provides at least two instances where VPN IDs need not be used. One instance occurs where an endpoint is communicating with an element within CO 170 or within the global space, such as an announcement server which sends media traffic, or a voicemail server, or a gateway going to the PSTN. The address, for example in the case of an announcement server, would be a routable address and thus VPN IDs would not be required. However, traffic still must continue flowing through apparatus 130 which will remove the VPN ID whenever needed. The other case where VPN IDs are not required is where both the source and destination endpoints reside in the same VPN. This situation is discussed in more detail below.

4. Handling Call Setup

Figure 3:
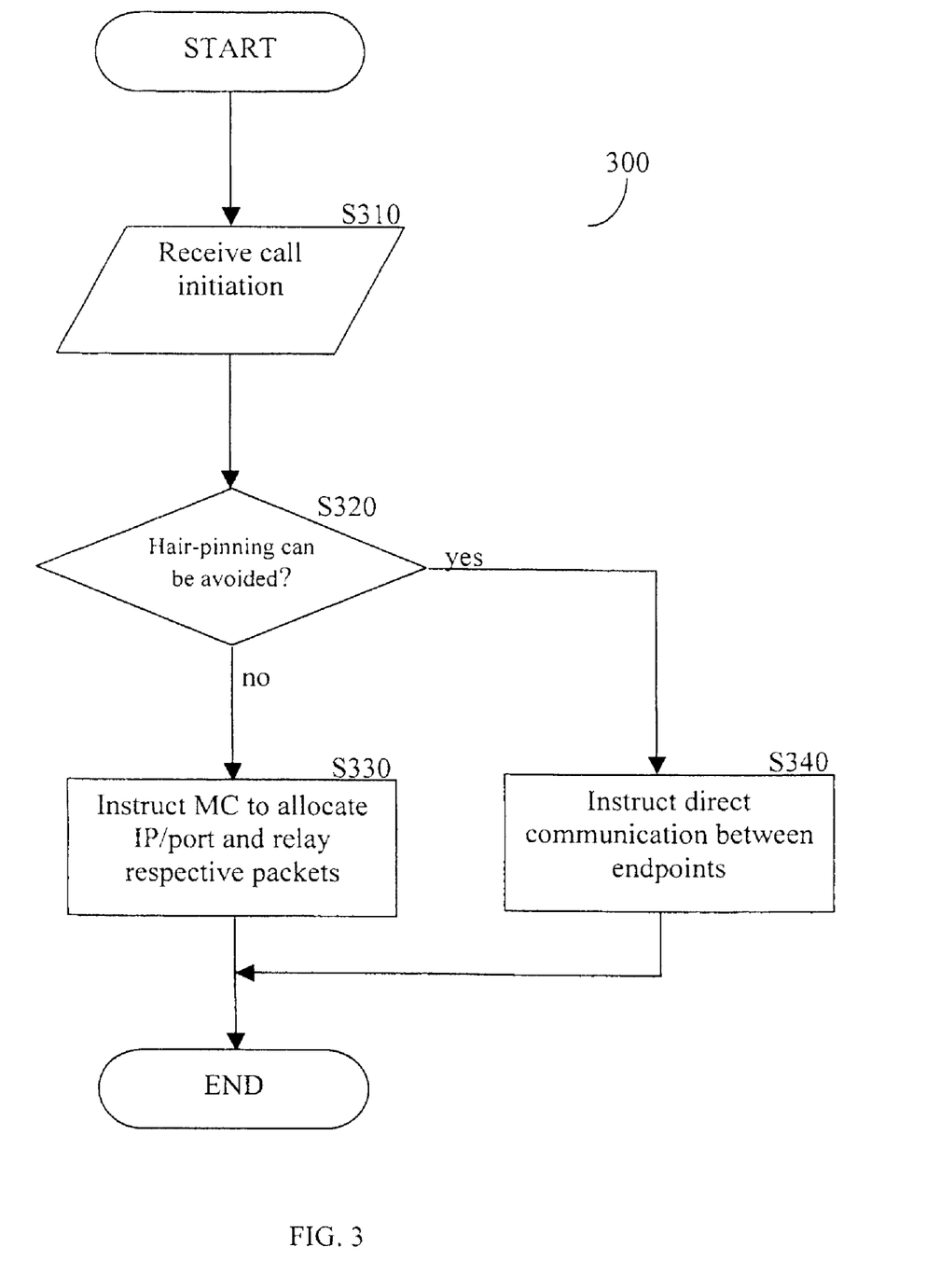
FIG. 3 is an exemplary flowchart for handling call setup signaling packets from an endpoint on a VPN.

FIG. 3 is an exemplary and non-limiting flowchart 300 illustrating the steps for handling call setup (e.g., INVITE in SIP) signaling packets directed from an endpoint 112 on a VPN 110.

In step S310 an INVITE signaling packet is received by SC of apparatus 130.

In step S320 the SC element of apparatus 130 determines whether hair-pinning of the media stream through the MC of apparatus 130 can be avoided. In this context, hair-pinning refers to a stream that proceeds from one device in a particular VPN to apparatus 130 and back to another device in the same VPN. Hair-pinning can be avoided if the source and destination devices can communicate directly to each other over the same VPN 110.

If hair-pinning can be avoided, then execution continues with step S340 in which the element of apparatus 130 instructs the endpoints to perform direct communication. Hair-pinning prevention is preferred in order to ensure better traffic engineering and to avoid unnecessary workload, and more specifically traffic load, in the system. If hair-pinning is required, or if hair-pinning prevention cannot be applied, in the case where the source and destination endpoints 112 are behind different VPNs 110, then execution continues with step S330 where the SC element of apparatus 130 instructs the MC element of apparatus 130 to allocate an <IP address, port> pair and relay respective media packets between the source and destination endpoints 112.

5. Other Call Processing and Endpoint Management Functions

Using the approaches herein, admission control, packet marking and other such functions may be performed on a per-VPN basis. Generally, call admission control refers to allowing and rejecting calls based on the number of concurrent calls and the amount of bandwidth is consumed. In one embodiment, one or more groups of users or endpoints are defined, such as all the endpoints of a specific enterprise, or all the endpoints on a given subnet, or all the endpoints with a specific phone number or name. For each group, a threshold specifying a maximum number of calls or bandwidth is defined. Thereafter, upon receiving a call initiation message, apparatus 130 or its signaling controller can decide whether to permit a new call or reject the call based on the group definitions. Defining groups with reference to VPNs is particularly useful, as each VPN usually comprises a single billing entity, such as an enterprise customer. A carrier using apparatus 130 can enforce limits on each such VPN customer. For example, apparatus 130 can limit the number of external calls that endpoints 112 in a given enterprise (or VPN) can make or the amount of bandwidth consumed by such calls. For this purpose, apparatus 130 can monitor the number of concurrent calls occurring for each VPN 110 as well as each endpoint 112, along with the bandwidth that is used by each such call.

In one embodiment, admission control is performed in apparatus 130 by receiving, through user input, a threshold value defining a maximum number of calls or maximum allowed call bandwidth; associating the threshold value with information identifying a virtual private network or an enterprise of which the source endpoint is a part; and selectively accepting or rejecting a call represented by the signaling packet based on whether the threshold value is exceeded.

In another embodiment, apparatus 130 additionally provides incoming data traffic filtering. Thus, apparatus 130 can filter data traffic directed towards the CO based on one or more filter definitions, for example, using access lists (ACLs). Apparatus 130 only allows entry of data traffic that is permitted by the filter definitions and denies the rest. In one embodiment, incoming data traffic filtering is used when a destination entity is within a carrier central office and involves receiving, through user input, one or more access control values defining one or more access controls for packet information destined for the destination entity; determining whether one or more of the access controls match parameters of a received packet; and dropping the received packet when one or more of the access controls match parameters of the received packet.

Apparatus 130 can also run a data firewall that performs other types of data protection such as defense against TCP SYN flood attacks, for example, by employing a SYN cookie method or other techniques.

In yet another embodiment, apparatus 130 provides endpoint troubleshooting and management. Because apparatus 130 has access to all endpoint devices, and information defining the endpoint devices, the apparatus can be used as a secure portal for managing and troubleshooting endpoints in different VPNs. For example, using apparatus 130 and an appropriate user interface application, a network administrator of a carrier can view a list of all endpoints and receive comprehensive information such as IP address, VPN, the last time the endpoint registered, the last time the endpoint made a call or received a call, the quality of these calls, etc. With appropriate programming of a management application in communication with apparatus 130, a carrier can ping one or more of the endpoints, given their endpoint names, without knowing their IP addresses or VPN identifiers. The carrier can also telnet into the endpoints, use SNMP to query the endpoints, reboot the endpoints, etc., with appropriate functional programming in a management application that manages apparatus 130.

In still another embodiment, for processing North America "911" calls and other applications that require the call control server to receive the exact location of an endpoint, apparatus 130 can provide the call control server with location information such as the endpoint IP address, the endpoint VPN identifier (VLAN tag), and the address of the firewall or NAT device that the endpoint is behind, if there is one. The call control server then can use this information to determine a location of an individual who placed a 911 call. When the SIP protocol is used, this information can be conveyed to the call control server by extending the Via field to include the VLAN tag, for example.

In yet another embodiment, apparatus 130 provides signaling rate limiting and call gapping for protecting signaling elements in the carrier network. In this embodiment, one or more capacity thresholds are defined for destination entities that are inside a carrier network, such as call control servers. Apparatus 130 maintains, in association with information defining each destination entity that is within the carrier network, a count of all signaling requests or call attempts that have been forwarded to each such destination entity. Upon receiving a signaling packet, apparatus 130 determines whether the total number of signaling requests or call attempts that have been forwarded to a specified destination entity exceeds the capacity threshold associated with that entity. If so, apparatus 130 sends the source endpoint a responsive signaling packet indicating that the requested signaling or call is refused. As a result, destination entities in the carrier network are protected from becoming overloaded by external requests and attacks.

Apparatus 130 also may provide similar controls for enforcement of policy against source endpoints, for example, for the purpose of preventing Denial of Service attacks originating from rogue source endpoints. The device can prevent a single entity (e.g. an endpoint) from sending too many signaling requests or call attempts. For example, policy may require that an IP phone should not generate more than one call attempt per second. In one embodiment, apparatus 130 maintains, in association with information defining each endpoint, a definition of a maximum number of signaling requests or call attempts allowed per second. Each such endpoint can have its own threshold definition, for example, based on its number of ports. As a specific example, an IAD with 4 ports, a gateway with 4 E1 connections, and an IP phone may have far different threshold definitions. Apparatus 130 also monitors and stores the rate or frequency of signaling requests or call attempts actually performed by each endpoint. In response to receiving a new signaling request or call attempt from a particular endpoint, apparatus 130 determines whether the current rate exceeds the maximum number allowed per second. If so, the signaling request or call attempt is refused, and optionally the apparatus 130 may return an error indication to the source endpoint. Additionally or alternatively, an entity that sends too many requests is put in a blacklist until cleared by the administrator.

In still another embodiment, apparatus 130 provides media rate limiting. For example, apparatus 130 can filter each media stream to make sure that bandwidth, packets per second, and packet length conform to requirements of a codec at the destination endpoint. Further, media rate limiting may involve determining the validity of various fields in the packet. Such a media rate limiting approach can provide protective benefits, for example, preventing gateways in the carrier network from becoming bombarded with non-legitimate media packets. As another example, media rate limiting ensures that users cannot perform prohibited actions, such as piggybacking video traffic with a voice call, etc.

In yet another embodiment, apparatus 130 provides protocol validation for signaling packets. For example, apparatus 130 can inspect signaling packets, determine the validity of fields within a signaling packet, and can forward the signaling packets only in response to determining that all fields of the signaling packets are valid. Inspecting can involve ensuring compliance with standards and that field values are appropriate. Such protocol validation can protect the forwarded-to entity from receiving packets with mal-formed signaling that is generated either by mistake or by a malicious endpoint.

6. Function and Structure of Media Controller

Figure 4:
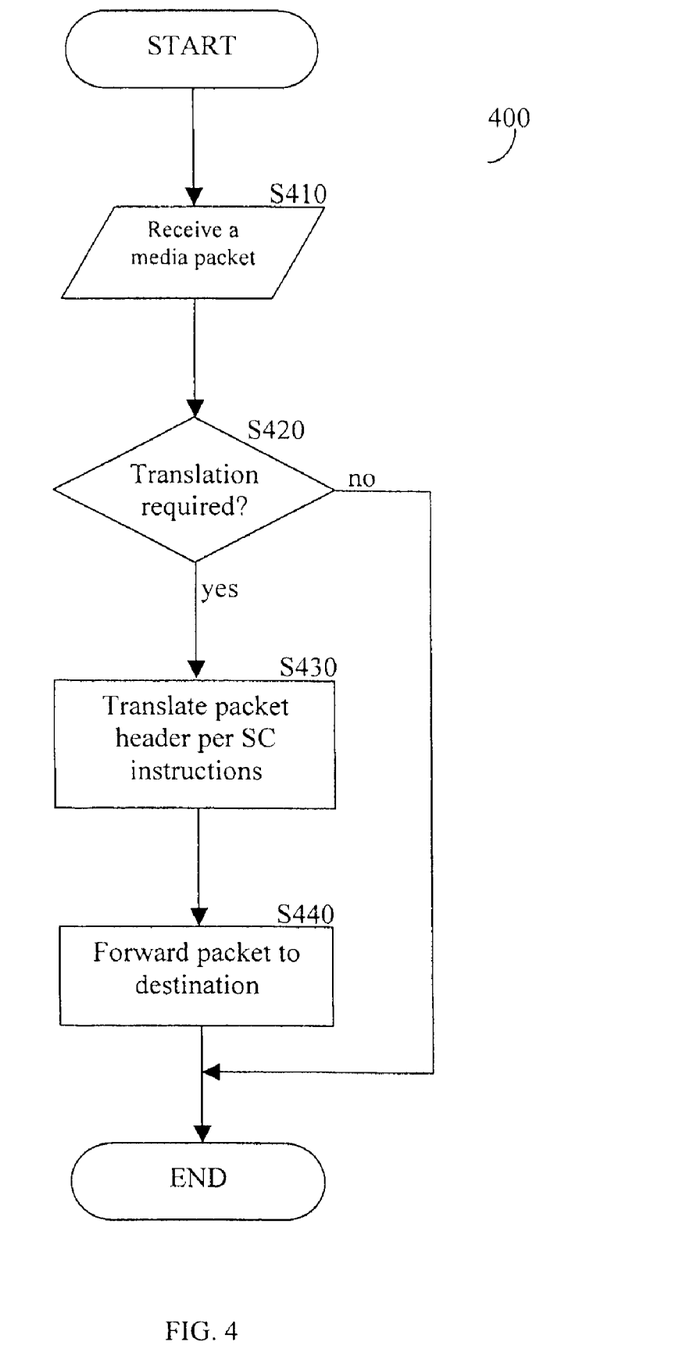
FIG. 4 is an exemplary flowchart for handling transfer of media packets to an endpoint in a VPN.

As noted above, media packets may be relayed through MC of apparatus 130. FIG. 4 describes how media packets are transferred to an endpoint 112 in a VPN 110. In step S410 the MC element of apparatus 130 receives a media packet. In step S420 the MC element of apparatus 130 determines whether a translation of the address is required, i.e., if the endpoint 112 is on a VPN 110. If translation is required, then execution continues with step S430; otherwise, no further action is required from MC of apparatus 130. In step S430 the packet header is translated according to instructions given by the SC element of apparatus 130. Specifically, the address is translated to correspond to the 6-tuple address, or 5-tuple address as the case may be, and as further explained in more details above. In step S440 the packet is forwarded, or relayed, to its destination.

The terms signaling controller and media controller are used in a general sense, as in apparatus 130, a form of packet processing occurs. All functions of apparatus 130 may be performed on one device or on separate devices. In one embodiment, the functions of the MC element of apparatus 130 and packet processing occur on the same device and the functions of the SC element of apparatus 130 are executed on a different device. In this embodiment, apparatus 130 includes a packet processor comprising hardware and software to determine where incoming and outgoing data traffic should be sent. Thus, the packet processor performs functions similar to the MC element of apparatus 130, and therefore the packet processor and media controller may be efficiently implemented on the same device. However, there may be cases where the media controller and packet processor should be implemented on separate devices, depending on the topology of the carrier network. Also, it is possible to have multiple signaling controllers residing in different geographical locations to, for example, perform load balancing.

Figure 5:
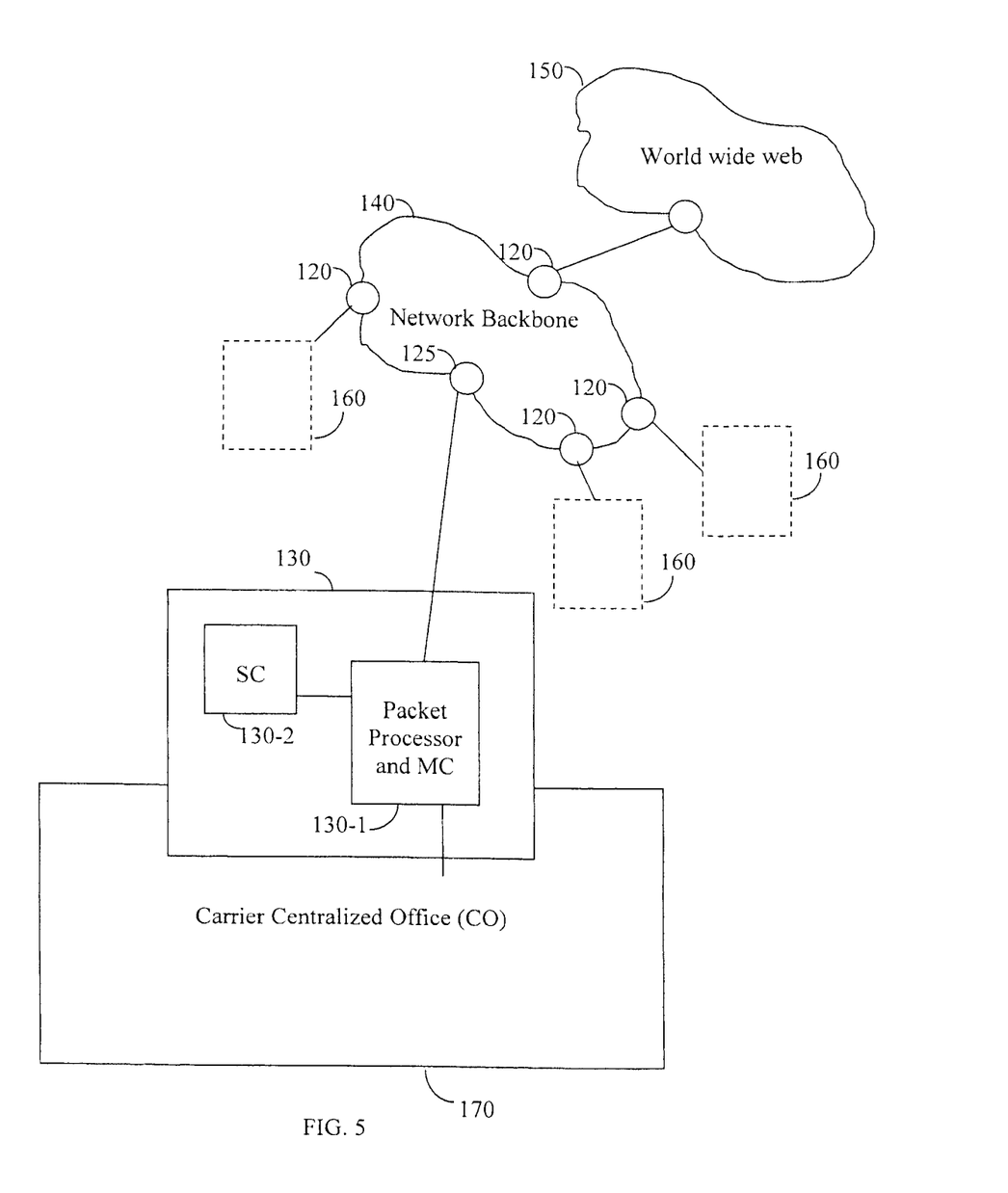
FIG. 5 is a schematic block diagram of a MoIP network.

FIG. 5 is a block diagram of describes one example of how apparatus 130 may be implemented. The separation of SC 130-2 and the media controller illustrates simply that they are residing on different devices or different boards in the same physical chassis. Similarly, the combination of the packet processor and media controller in the same block 130-1 illustrates that they run on the same device. All data traffic flows through aggregation router 125 towards apparatus 130. Because packet processor 130-1 owns all the IP addresses, all data traffic must pass through packet processor 130-1. The purpose of packet processor 130-1 is to forward data to appropriate internal components such as SC 130-2 and CO 170. SC 130-2, as described above, handles registration and call setup and determines whether hair-pinning can be avoided.

Figure 6:
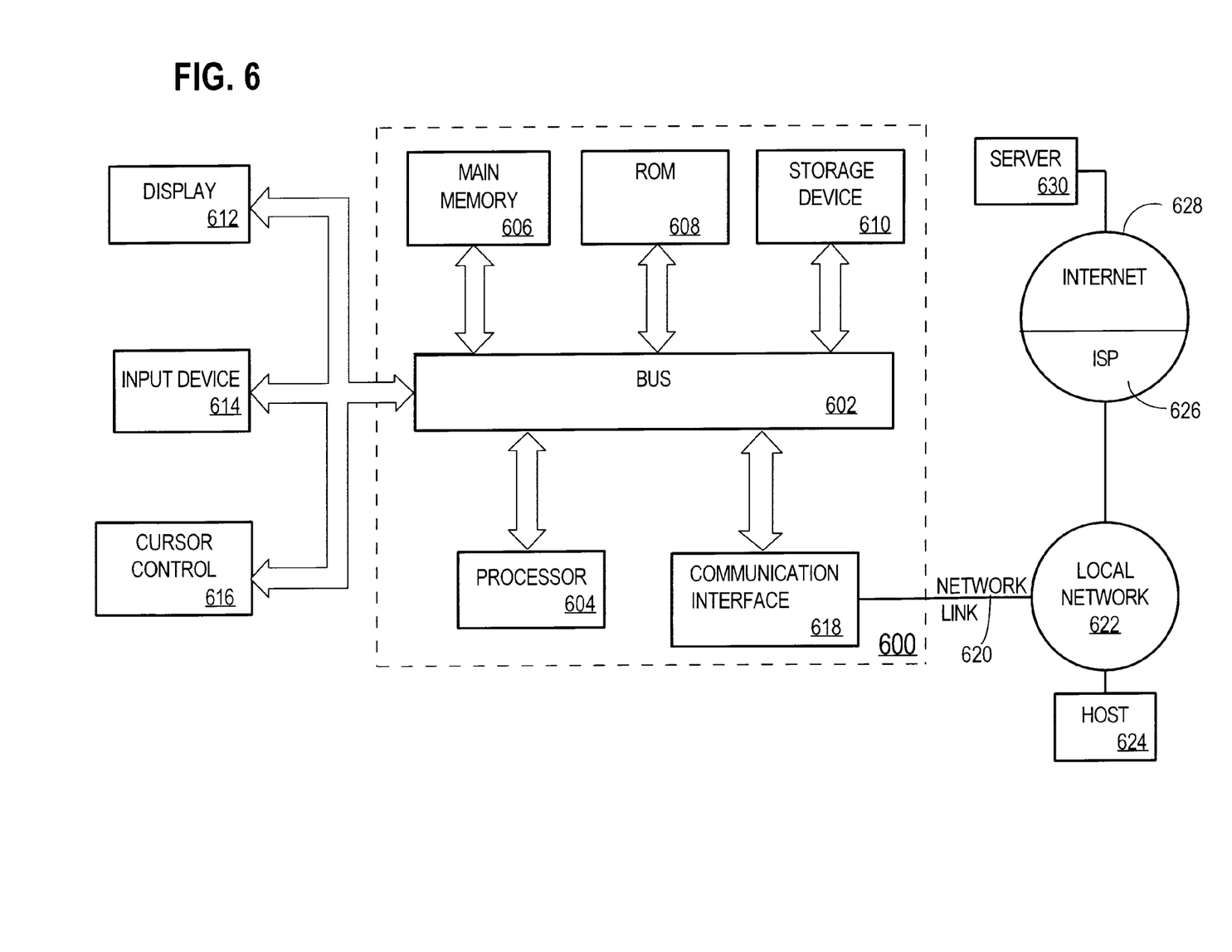
FIG. 6 is a block diagram of a computer system upon which an embodiment may be implemented.

FIG. 6 is a block diagram of a computer system 600 upon which an embodiment may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

The invention claimed is:

1. A network element for communicating packet data between a source endpoint and a destination entity, wherein the source endpoint and destination entity are within virtual private networks (VPNs) having potentially overlapping address spaces, the network element comprising:
   means for receiving a first signaling packet from the source endpoint;
   means for registering the source endpoint by creating and storing a mapping of an IP address value, a port number value, and a virtual private network identifier (VPN ID) for the source endpoint to an IP address value and a port number for a network element;
   means for modifying a header of the first signaling packet to use the IP address value and port number value of the network element;
   means for modifying a payload of the first signaling packet to conform the first signaling packet to a signaling protocol; and
   means for forwarding the first signaling packet to the destination entity.

2. The network element of claim 1, further comprising:
   means for receiving an additional signaling packet;
   means for modifying a header of the additional signaling packet based on the stored mapping; and
   means for forwarding the additional signaling packet to the destination entity.

3. The network element of claim 1, wherein the network element is a border controller.

4. The network element of claim 1, wherein the network element comprises:
   a signaling controller;

a media controller that is communicatively coupled to the signaling controller; and a packet processor that is coupled to the media controller.

5. The network element of claim 1, wherein the source endpoint is logically positioned behind a firewall or a network address translation device.

6. The network element of claim 1, wherein the destination entity is in a carrier network.

7. A system comprising:

a plurality of different virtual private networks (VPNs) having potentially overlapping address spaces;

a source endpoint located in a first one of the VPNs and a destination entity located in a second one of the VPNs;

a network element comprising:

a storage medium to store a mapping of an IP address value, a port number value, and a VPN identifier for the source endpoint to an IP address value and a port number value for the network element, and a packet processor to modify a header of a signaling packet from the source endpoint in accordance with the mapping to use the IP address value and port number value of the network element, wherein the packet processor further modifies a payload of the packet to conform the packet to a signaling protocol and forwards the packet to the destination entity.

8. A method for communicating packet multimedia data between a source endpoint and a destination endpoint, wherein at least the source endpoint is within a virtual private network, the method comprising the steps of:

receiving, at a signaling controller, a signaling packet for call initiation from the source endpoint, wherein the source endpoint is within a virtual private network;

determining whether the source endpoint and destination endpoint may communicate directly;

when the source endpoint and destination endpoint cannot communicate directly, instructing a media controller to allocate an IP address and port number value; and when the source endpoint and destination endpoint can communicate directly, instructing the source endpoint and destination endpoint to communicate media packets directly.

9. A system for communicating packet multimedia data between a source endpoint and a destination endpoint, one or both of which may be part of one or more virtual private networks, the system comprising:

a signaling controller having one or more processors and a computer-readable medium; and a media controller that is communicatively coupled to the signaling controller and to a packet multimedia data network, wherein the computer-readable medium comprises one or more sequences of instructions for communicating packet multimedia data between a source endpoint and a destination endpoint, wherein at least the source endpoint is within a virtual private network that is coupled to the packet multimedia data network, which instructions, when executed by the one or more processors, cause the one or more processors to:

receive, at the signaling controller, a signaling packet for call initiation from the source endpoint, wherein the source endpoint is within a virtual private network;

determine whether the source endpoint and destination endpoint may communicate directly;

when the source endpoint and destination endpoint cannot communicate directly, instruct the media controller to allocate an IP address and port number value for use in network address translation for media packets for the call; and when the source endpoint and destination endpoint can communicate directly, instruct the source endpoint and destination endpoint to communicate media packets directly.

10. The system of claim 9, wherein the system is located within a centralized office that provides services to the endpoints and that is owned or operated by a carrier of the packet multimedia data network.

* * * * *